US008806334B2

(12) United States Patent
Arakane et al.

(10) Patent No.: US 8,806,334 B2
(45) Date of Patent: Aug. 12, 2014

(54) DISPLAY DEVICE FOR DISPLAYING SETUP SCREEN WITH SCREEN NAVIGATION PATH

(75) Inventors: Satoru Arakane, Nagoya (JP); Hajime Inada, Chiryu (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 518 days.

(21) Appl. No.: 12/748,802

(22) Filed: Mar. 29, 2010

(65) Prior Publication Data
US 2010/0281360 A1    Nov. 4, 2010

(30) Foreign Application Priority Data

May 1, 2009  (JP) .................................. 2009-112238

(51) Int. Cl.
*G06F 17/00*  (2006.01)
(52) U.S. Cl.
USPC ............ 715/254; 715/810; 715/817; 715/204
(58) Field of Classification Search
USPC ......... 715/810, 817, 818, 819, 820, 244, 204, 715/254
See application file for complete search history.

(56) References Cited

U.S. PATENT DOCUMENTS

| | | | | |
|---|---|---|---|---|
| 6,661,437 | B1 * | 12/2003 | Miller et al. | 715/810 |
| 7,386,805 | B2 * | 6/2008 | Li | 715/781 |
| 2004/0230916 | A1 * | 11/2004 | Salvatori et al. | 715/810 |
| 2005/0234979 | A1 * | 10/2005 | Martineau et al. | 707/103 X |
| 2006/0123361 | A1 * | 6/2006 | Sorin et al. | 715/854 |
| 2007/0156651 | A1 * | 7/2007 | Weigel et al. | 707/3 |
| 2007/0157127 | A1 * | 7/2007 | Moehrle | 715/853 |

FOREIGN PATENT DOCUMENTS

| | | |
|---|---|---|
| JP | 9-269883 A | 10/1997 |
| JP | 2006-236142 A | 9/2006 |

OTHER PUBLICATIONS

Jacob Gube, Breadcrumbs in Web Design: Examples and Best Practices, Mar. 2009.*

* cited by examiner

*Primary Examiner* — Cesar Paula
*Assistant Examiner* — Howard Cortes
(74) *Attorney, Agent, or Firm* — Scully, Scott, Murphy & Presser, P.C.

(57) ABSTRACT

A display device includes a display unit, a storing unit, a navigation string generating unit, and a display control unit. The display unit includes a first region and a second region. The display unit displays, in the first region, one of a plurality of screen images managed hierarchically. The plurality of screen images includes a first screen image and a second screen image. The storing unit stores a plurality of character strings corresponding to the plurality of screen images. The navigation string generating unit includes a specifying unit and a generating unit. The specifying unit specifies a setting value selected for at least the second screen image that was navigated through to arrive at the first screen image currently displayed in the first region. The generating unit generates a navigation string including at least one of the character strings corresponding to the second screen image and a setting data representing the setting value. The display control unit controls the display unit to display the navigation string in the second region.

10 Claims, 9 Drawing Sheets

SCREEN MANAGEMENT TABLE 12b

| HIERARCHICAL LEVEL | 1 | | 2 | | 3 | | 4 | | 5 | | 6 | |
|---|---|---|---|---|---|---|---|---|---|---|---|---|
| SCREEN TITLE/ TITLE ID/ SCREEN TYPE | MENU | ID000 MENU | GENERAL SETUP | ID100 MENU | MODE TIMER | ID101 MENU | | | | | | |
| | | | | | PAPER TYPE | ID102 MENU | | | | | | |
| | | | | | PAPER SIZE | ID103 MENU | | | | | | |
| | | | FAX | ID200 MENU | SETUP RECIEVE | ID201 MENU | RING DELAY | ID204 MENU | | | | |
| | | | | | | | FAX PREVIEW | ID205 MENU | | | | |
| | | | | | PRINT FAX | ID202 MENU | | | | | | |
| | | | NETWORK | ID300 MENU | WIRED LAN | ID301 MENU | TCP/IP | ID304 MENU | IP ADDRESS | ID306 MENU | | |
| | | | | | | | | | SUBNET MASK | ID307 MENU | | |
| | | | | | | | | | GATEWAY | ID308 MENU | | |
| | | | | | WLAN | ID302 MENU | SETUP WIZARD | ID305 MENU | SSID | ID309 WIZARD | MODE | ID310 WIZARD |
| | | | | | FACTORY RESET | ID303 MENU | | | | | | |

MENU > NETWORK > WLAN > SETUP WIZARD ← 35a
SSID: ABC > MODE ← 35b

Fig. 4B

BREADCRUMBS STRUCTURE Bt

| HIERARCHICAL LEVEL | 1 | 2 | 3 | 4 | 5 | 6 |
|---|---|---|---|---|---|---|
| TITLE ID | ID000 | ID300 | ID302 | ID305 | ID309 | ID310 |
| SCREEN TYPE | MENU | MENU | MENU | MENU | WIZARD | WIZARD |
| SETTING VALUE | NULL | NULL | NULL | NULL | ABC | |

DISPLAY DEVICE FOR DISPLAYING SETUP SCREEN WITH SCREEN NAVIGATION PATH

CROSS REFERENCE TO RELATED APPLICATION

This application claims priority from Japanese Patent Application No. 2009-112238 filed May 1, 2009. The entire content of this priority application is incorporated herein by reference.

TECHNICAL FIELD

The present invention relates to a display device for displaying a setup screen with a screen navigation path.

BACKGROUND

A multifunction peripheral is well known in the art as a single device capable of implementing a plurality of functions, such as a facsimile function, printer function, scanner function, and copier function. The multifunction peripheral allows a user to modify various setting items, such as resolution, density, and zoom percentage. The user can execute a desired operation on the multifunction peripheral after modifying the setting values as desired.

For example, the user may follow the procedure below to modify setting values for the multifunction peripheral. First, the multifunction peripheral displays a setup menu screen in a display panel provided on the multifunction peripheral. The menu screen includes various choices for each function of the multifunction peripheral, such as facsimile setup and scanner setup, as well as a general setup selection. When the user selects one of the choices listed in the menu, the multifunction peripheral changes the display on the display panel to a list of setting items related to the selected function.

When the user selects one of the setting items from the displayed list, the multifunction peripheral changes the display on the display panel to a modification screen in which the user can modify the value assigned to the setting item. While the modification screen is displayed, the user may input or modify the value assigned to the setting item as desired.

As the user performs operations to navigate through the prepared screens in this way, data indicating the path that the user has taken to arrive at the current screen may also be displayed in the display panel together with the current screen. One conventional format for displaying this path is called "breadcrumbs."

Breadcrumbs (or "breadcrumb trail") is a format for displaying the name of each screen that the user has navigated through to arrive at the current screen in the order displayed, such as in the example "Menu screen>Facsimile setup>Resolution." Through the breadcrumbs displayed with each screen, the user can determine to which function and to which setting item the current screen is related.

SUMMARY

A "wizard" is a function for displaying a plurality of screens in a predetermined order to guide the user in inputting values for a plurality of setting items according to a fixed procedure. When setting up a network, for example, the user is first prompted to set whether the device connects to a wired LAN or a wireless LAN. If the user selects "wireless LAN," the user is prompted to set a service set identifier (SSID) identifying the access point, a connection mode, a communication encryption standard, and the like in a prescribed sequence.

However, since the information in the breadcrumbs described above presents only the history of screen transitions, the conventional device does not adequately provide the user with useful information for performing a series of settings. For example, when performing a series of setting operations in screens displayed according to a wizard format, the user might input an incorrect value for one setting that has unexpected consequences. Unless the user is able to remember what values were inputted at each stage of the wizard, the user cannot determine the stage in the wizard from which settings must be repeated.

In view of the foregoing, it is an object of the present invention to provide a display device capable of clearly presenting to the user setting values that the user inputted for setting items in all displayed screens leading up to the currently displayed screen.

In view of the foregoing, it is an object of the invention to provide a display device. The display device includes a display unit, a storing unit, a navigation string generating unit, and a display control unit. The display unit includes a first region and a second region. The display unit displays, in the first region, one of a plurality of screen images managed hierarchically. The plurality of screen images includes a first screen image and a second screen image. The storing unit stores a plurality of character strings corresponding to the plurality of screen images. The navigation string generating unit includes a specifying unit and a generating unit. The specifying unit specifies a setting value selected for at least the second screen image that was navigated through to arrive at the first screen image_currently displayed in the first region. The generating unit generates a navigation string including at least one of the character strings corresponding to the second screen image and a setting data representing the setting value. The display control unit controls the display unit to display the navigation string in the second region.

According to another aspect, the present invention provides a method for displaying a navigation string together with one of a plurality of screen images managed hierarchically. The plurality of screen images including a first screen image and a second screen image. The method includes specifying a setting value selected for at least the second screen image that was navigated through to arrive at the first screen image currently displayed a the first region of a display device, generating a navigation string including at least one of character strings corresponding to the second screen image and a setting data representing the setting value, and displaying the navigation string in a second region of the display device.

BRIEF DESCRIPTION OF THE DRAWINGS

The particular features and advantages of the invention as well as other objects will become apparent from the following description taken in connection with the accompanying drawings, in which.

DETAILED DESCRIPTION

A multifunction peripheral (MFP) 1 according to an embodiment of the invention will be described while referring to the accompanying drawings wherein like parts and components are designated by the same reference numerals to avoid duplicating description.

The MFP 1 is a multifunction peripheral having multiple functions, including a facsimile function and a printer function. The MFP 1 allows a user to modify values of various setting items defining operating conditions and the like for each function. The MFP 1 organizes and manages a plurality of setup screens in hierarchical levels and displays the screens on a liquid crystal display (LCD) 27 in response to user operations for allowing the user to modify the value of each setting item. As will be described later in greater detail, the MFP 1 can display a menu breadcrumbs 35a and a wizard breadcrumbs 35b (see FIG. 3) on the LCD 27 in the form of character strings by which the user can determine the hierarchical level for the currently displayed setup screen.

Figure 1:
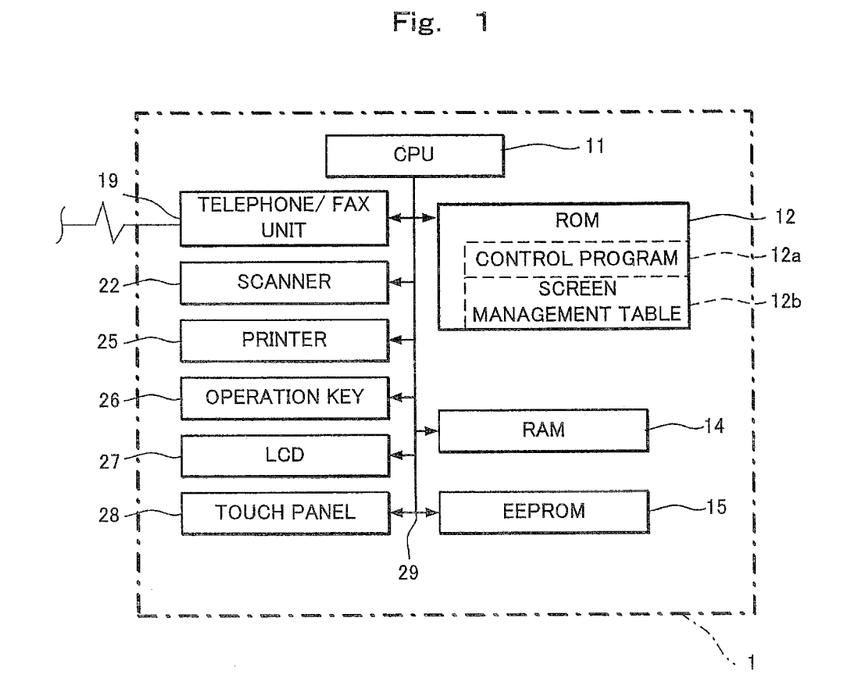
FIG. 1 is a schematic diagram showing an electrical construction of a multifunction peripheral according to an embodiment of the present invention.

As shown in FIG. 1, the MFP 1 includes a CPU 11, a ROM 12, a RAM 14, an EEPROM 15, a telephone/fax unit 19, a scanner 22, a printer 25, an operation key 26, the LCD 27, and a touch panel 28. These are interconnected with a bus line 29 with each other. Although not shown in the drawings, the MFP 1 further includes an interface for connecting with a personal computer and LAN and other components.

The ROM 12 is a nonvolatile memory in which a control program 12a and a screen management table 12b are stored. The CPU 11 executes a setup screen display process shown in FIGS. 5 to 9 based on the control program 12a. The screen management table 12b is pre-stored in the ROM 12 during the manufacturing stage of the MFP 1. The screen management table 12b will be described later with reference to FIG. 2.

The RAM 14 is a volatile memory for temporarily storing data. The EEPROM 15 is a nonvolatile memory for storing various setting items and fixed values, and retains data even after power is turned OFF.

The operation key 26 includes a numeric keypad (not shown) for entering numerical values and a Cancel key (not shown) for cancelling a process executed by the CPU 11.

The LCD 27 has an LCD panel (not shown). The MFP 1 displays prepared setup screens in the LCD panel of the LCD 27 as needed. These setup screens will be described later with reference to FIG. 3. The touch panel 28 is a type of input device and is disposed parallel and in proximity to a display surface of the LCD panel. When the user touches the display surface of the LCD panel with a finger or the like, the touch panel 28 detects the position of the finger with respect to the LCD panel.

The MFP 1 can switch to one of a print mode for printing, a facsimile mode for receiving and sending a facsimile, and a setup mode for changing setting items.

Figure 2:
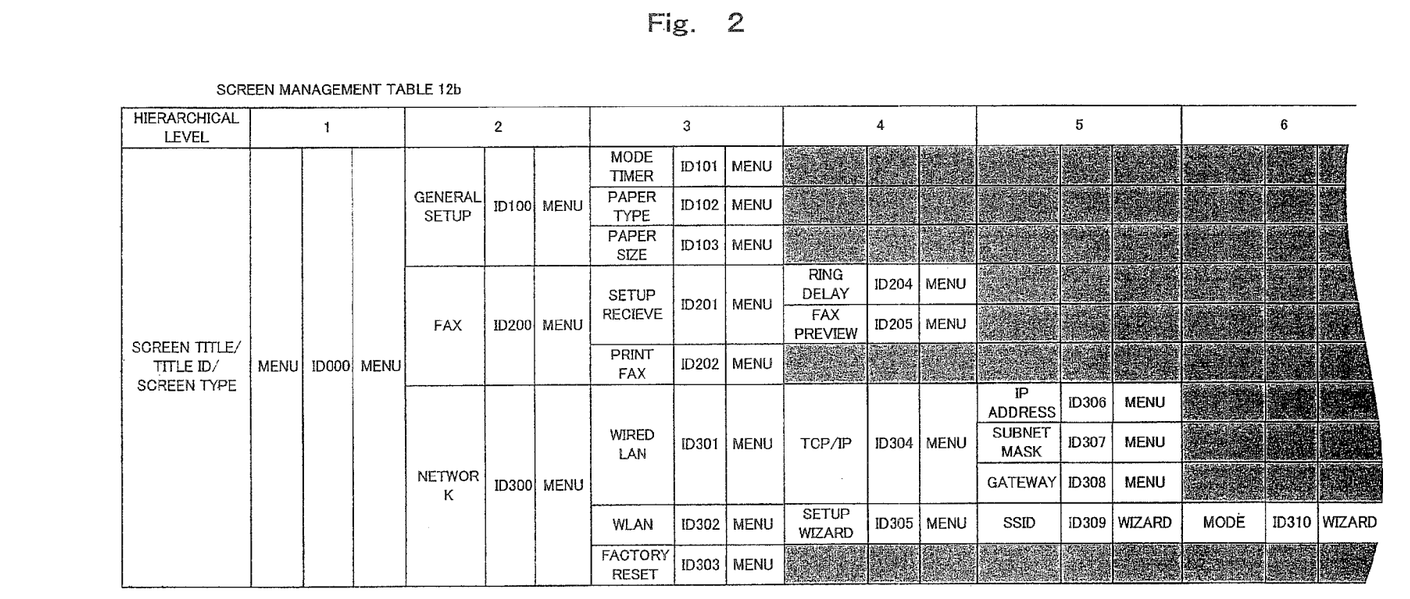
FIG. 2 is an explanatory diagram showing a sample configuration of a screen management table.

FIG. 2 shows a sample configuration of the screen management table 12b. The screen management table 12b defines a hierarchical level, a screen title, a title ID, and a type for each setup screen. The MFP 1 organizes and manages a plurality of the setup screens in hierarchical levels based on the screen management table 12b.

The "level number" is a value indicating the hierarchical level to which a setup screen belongs. In the example shown in FIG. 2, each of the setup screens belongs to one of first through sixth levels, where a smaller level number represents a higher hierarchical level. The screen title is configured of a descriptive character string by which the content of the setup screen can be discerned. One screen title is uniquely associated with each setup screen. The title ID is a resource ID in the form of a character string. One title ID is uniquely assigned to each screen title and is used to create a menu breadcrumbs 35a and wizard breadcrumbs 35b, as will be described later.

As shown in FIG. 2, a menu screen having a screen title "Menu" is defined in the screen management table 12b as a setup screen in the first level (hierarchical level 1). Setup screens defined for the second level (hierarchical level 2) directly beneath the first level are a general setup screen having a screen title "General Setup", a fax screen having a screen title "Fax", and a network setup screen having a screen title "Network". The screen management table 12b further stores data related to setup screens belonging to hierarchical levels lower than the second level. Note that hierarchical levels corresponding to the seventh level and lower have been omitted from FIG. 2.

The MFP 1 transitions between the setup screens from the top hierarchical level to each lower level in sequence. For example, in order to display a TCP/IP setup screen (having a screen title "TCP/IP") belonging to the fourth level, the MFP 1 first displays the setup screen (having the screen title "Menu") of the first level, then displays the network setup screen (having the screen title "Network") of the second level, then displays a LAN setup screen (having a screen title "Wired LAN") of the third level, and finally displays the TCP/IP setup screen of the fourth level.

The screen management table 12b classifies each setup screen as either a "Menu" type or a "Wizard" type. In the following description, setup screens of a type "Menu" will be referred to as "menu screens" while setup screens of a type "Wizard" will be referred to as "wizard screens." If the user performs an operation in a displayed menu screen to select a setup screen positioned in the hierarchical level below the menu screen, the MFP 1 changes the display on the LCD 27 to the lower level setup screen corresponding to the user's selection.

However, with a wizard format, the MFP 1 displays a plurality of wizard screens in order according to hierarchical level, prompting the user to input values for a series of settings in a predetermined sequence. Specifically, after the user inputs a value for a setting in a displayed wizard screen, the MFP 1 changes the display on the LCD 27 to the next wizard screen one hierarchical level lower. For example, if the user inputs an SSID in the wizard screen of the fifth level having a screen title "SSID," the MFP 1 changes the display on the LCD 27 to the sixth-level wizard screen, prompting the user to input a value for this next setting item.

Figure 3A:
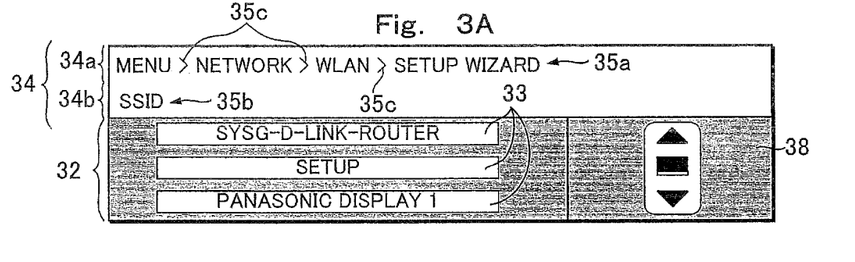
FIG. 3A is a "SSID" screen having a slider bar area displayed on a LCD.

Images displayed on the LCD 27 will be described with reference to FIGS. 3A-3E. As shown in FIG. 3A, the display area of the LCD panel includes a selection display area 32 and a screen description area 34.

A setup screen is displayed in the selection display area 32. The setup screen includes various selections 33 that can be operated by the user to perform a selection. Each selection 33 is a display element that functions as a button for accepting a user operation. In the example shown in FIG. 3A, a wizard screen of the fifth level having the screen title "SSID" is displayed in the selection display area 32. The wizard screen includes selections 33 indicating setting values that may be inputted in the current setup screen. In contrast, selections 33 included in a menu screen indicate the screen titles of setup screens positioned one level below the level of the currently displayed setup screen.

Thus, when the displayed setup screen is a wizard screen, a user operation to touch one of the selections 33 in the LCD panel is equivalent to an operation for inputting a value in the wizard screen. When the setup screen is a menu screen, the same operation is equivalent to selecting a setup screen one level lower. In either case, the MFP 1 changes the display to a setup screen in the next lower level based on the user's operation.

The screen description area 34 includes a first character string display area 34a occupying the upper half thereof, and a second character string display area 34b occupying the lower half thereof. The first character string display area 34a is provided for displaying the menu breadcrumbs 35a. The menu breadcrumbs 35a are a character string formed by arranging the screen title corresponding to each menu screen that has been displayed up to the currently displayed setup screen in a single horizontal line in order of hierarchical level. In the example shown in FIG. 3A, a character string formed by concatenating the screen titles of menu screens from the first level to the fourth level that have been displayed up to the currently displayed setup screen of the fifth level is displayed as the menu breadcrumbs 35a. Based on the menu breadcrumbs 35a, the user can determine the history of menu screens displayed prior to the currently displayed screen (i.e., the menu screen navigation path leading up to the current screen).

When the number of selections 33 is too large to display all selections 33 at once, the MFP 1 draws a sidebar area 38 in the selection display area 32 as shown in FIG. 3A. By operating the sidebar area 38, the user can scroll the selections 33 to reveal selections 33 outside the display area.

The MFP 1 also adds a ">" symbol to the head of each screen title in the menu breadcrumbs 35a as a separating character 35c functioning to separate screen titles for different levels. Based on the separating characters 35c, the user can identify each screen title in the menu breadcrumbs 35a.

The second character string display area 34b serves to display the wizard breadcrumbs 35b. The wizard breadcrumbs 35b is a character string formed by arranging the screen title corresponding to each wizard screen up to the currently displayed setup screen in a single horizontal line in order of hierarchical level. In the example shown in FIG. 3A, only the screen title "SSID" for a wizard screen of the fifth level is displayed as the wizard breadcrumbs 35b since this fifth level setup screen is the only wizard screen that has been displayed thus far.

Hence, the MFP 1 according to the preferred embodiment displays screen titles for menu screens and screen titles for wizard screens in separate breadcrumbs provided in different lines. Thus, while the MFP 1 is displaying a plurality of wizard screens in a predetermined sequence according to the wizard format, the user can easily tell the hierarchical level in which the currently displayed wizard screen belongs. That is, the user can understand what operations were performed before the wizard was started based on the menu breadcrumbs 35a displayed in the top of the screen description area 34 and can understand the sequence of operations performed after the wizard was started based on the wizard breadcrumbs 35b displayed in the bottom of the screen description area 34.

Figure 3B:
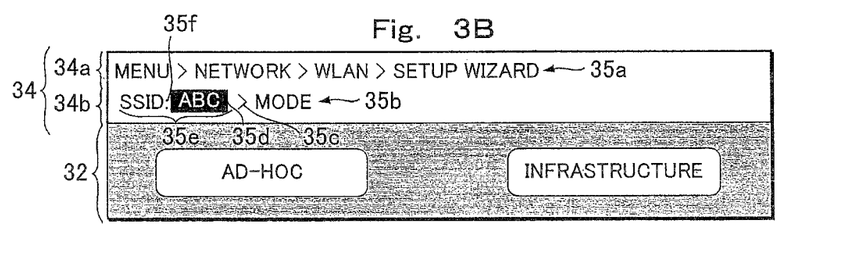
FIG. 3B is a "Mode" screen on the LCD after an "abc" is inputted in FIG. 3A.
Figure 3C:
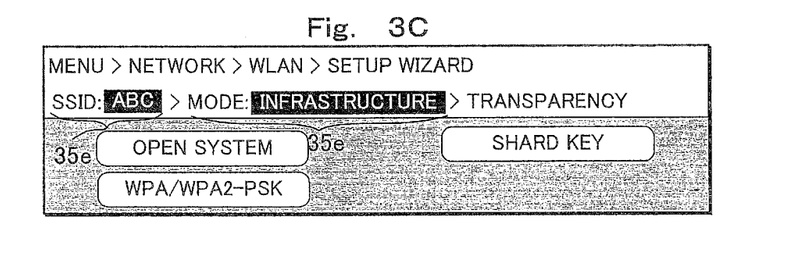
FIG. 3C is a "Transparency" screen on the LCD after an "Infrastructure" is selected in FIG. 3B.

Next, if the user inputs a value for the wizard screen having the screen title "SSID" by pressing one of the selections 33, the MFP 1 adds to the screen title "SSID" a setting value 35d representing the value inputted in the wizard screen associated with the screen title "SSID," and a symbol ":" as a separating character 35f interposed between the screen title "SSID" and the setting value 35d to separate them, thereby forming level data 35e by concatenating the screen title and the setting value 35d in the longitudinal direction of the wizard breadcrumbs 35b, and displays the result in the second character string display area 34b. For example, if the user has inputted the value "abc" in the wizard screen having the screen title "SSID" through the operating key 26, the MFP 1 changes the display in the selection display area 32 to the wizard screen having a screen title "Mode" and updates the wizard breadcrumbs 35b, as shown in FIG. 3B. Similarly, if the user selects an "Infrastructure" in the wizard screen having the screen title "Mode" in the sixth hierarchical level, the MFP 1 changes the display from the wizard screen having the screen title "Mode" to a wizard screen having a screen title "Transparency" as shown in FIG. 3C. In this way, the user can easily see what values were inputted in each wizard screen associated with each screen title in the wizard breadcrumbs 35b.

As shown in FIG. 3B, the MFP 1 also adds the separating character 35e and the screen title "Mode" for the new wizard screen to the wizard breadcrumbs 35b. Thus, each time a setting value is inputted in a wizard screen, the MFP 1 advances to the next wizard screen, and adds the inputted setting value 35d, the separating character 35c and the screen title for the new wizard screen to the screen title for the last wizard screen in the wizard breadcrumbs 35b in the longitudinal direction of the wizard breadcrumbs 35b.

In this way, the MFP 1 can present a series of values inputted for all wizard screens displayed by the wizard to the user altogether in the wizard breadcrumbs 35b.

Further, by interposing the separating character 35c between adjacent level data 35e, the user can differentiate each level data 35e formed of a screen title and a setting value 35d for a single wizard screen.

The separating character 35f aids the user in differentiating the screen title from the setting value 35d. By employing different characters for the separating characters 35f and 35c, the user can readily understand which separating character functions to separate level data 35e and which functions to separate data within level data 35e.

The MFP 1 also displays the setting values 35d in a different style than that used for displaying the screen titles. Thus, the user can easily distinguish between screen titles and setting values 35d that are alternated in the wizard breadcrumbs 35b.

In order to distinguish the screen titles and setting values 35d using different display styles, the MFP 1 according to the preferred embodiment displays screen titles in the wizard breadcrumbs 35b with no background color, but displays the setting values 35d as white characters on a colored background. However, the method of distinguishing screen titles from setting values 35d is not limited to the display styles described above. For example, both the setting values 35d and the screen titles may be displayed with no background color, using only different colors of text to distinguish the two.

In some cases, the breadcrumbs 35a or 35b grow to an extent that the entire breadcrumbs 35a or 35b from beginning to end cannot fit within the screen description area 34. For example, after the user has set a communication mode in the sixth-level wizard screen having the screen title "Mode" and has set a security function in the seventh-level wizard screen having the screen title "Transparency," all of the wizard breadcrumbs 35b cannot be displayed at once in the screen description area 34.

Figure 3D:
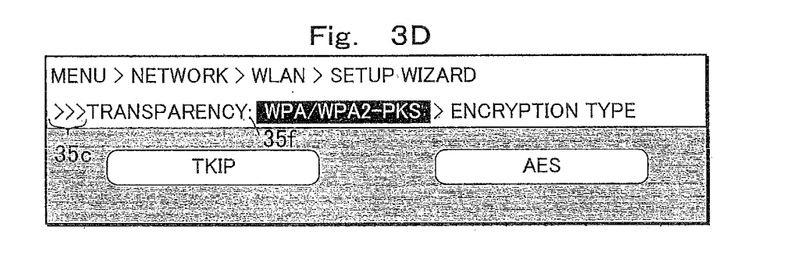
FIG. 3D is an "Encryption Type" screen on the LCD after a "WPA/WPA2-PKS" is selected in FIG. 3C.

In this case, as shown in FIG. 3D, the MFP 1 collapses (excludes from the display) one or more screen titles in the higher levels, leaving only the separating characters 35c to mark their omission. By adjusting the wizard breadcrumbs 35b in this way, the user can see screen titles for wizard screens nearest the currently displayed wizard screen. Further, since the separating characters 35c are left in the display while omitting only the screen titles, the user can discern how many screen titles have been excluded based on the number of separating characters 35c remaining in the display. While the above description on collapsing screen titles focuses only on the wizard breadcrumbs 35b, the MFP 1 also excludes some of the screen titles in the menu breadcrumbs 35a based on the same conditions.

Figure 4A:
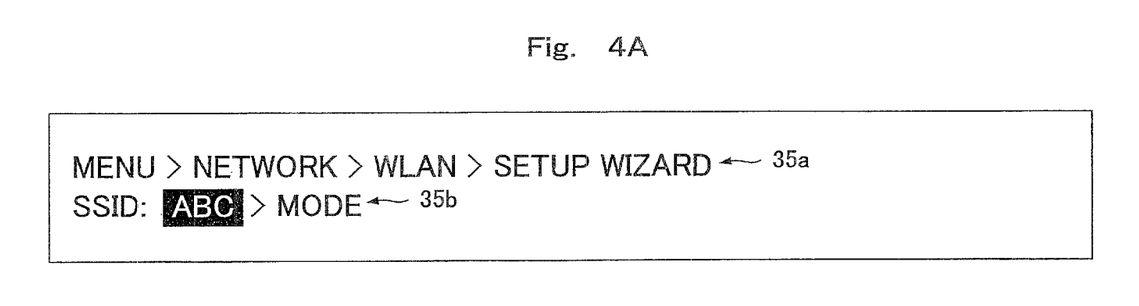
FIG. 4A is an enlarged view of a menu breadcrumbs and a wizard breadcrumbs on the LCD.
Figure 4B:
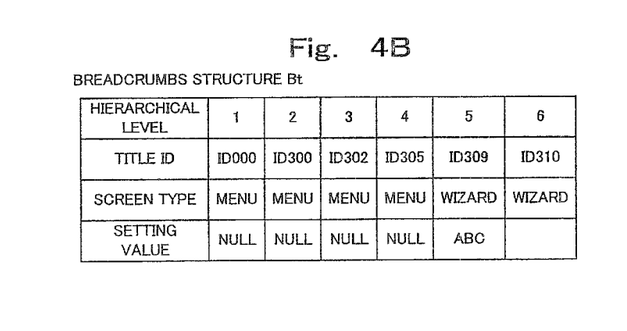
FIG. 4B is a conceptual diagram illustrating a breadcrumbs structure to be created for displaying the breadcrumbs.

Next, a breadcrumbs structure Bt created by the MFP 1 for displaying the breadcrumbs 35a and 35b will be described with reference to FIGS. 4A-4B. FIG. 4A shows the menu breadcrumbs 35a and the wizard breadcrumbs 35b displayed on the LCD 27. FIG. 4B conceptually illustrates the breadcrumbs structure Bt created for displaying the menu breadcrumbs 35a and the wizard breadcrumbs 35b shown in FIG. 4A.

The menu breadcrumbs 35a shown in FIG. 4A were created by arranging menu screen titles in hierarchical order from the first level to the fourth level, while the wizard breadcrumbs 35b were created by arranging wizard screen titles in hierarchical order for the fifth and sixth levels.

For this case, data related to setup screens for the first through sixth levels is recorded in the breadcrumbs structure Bt. As shown in FIG. 4B, the breadcrumbs structure Bt is an array of data that functions to store one each of a title ID, a screen type, and a setting value for each level. The breadcrumbs structure Bt is updated each time the displayed setup screen changes.

The "title ID" is an ID stored in the screen management table 12b in association with a screen title displayed in the breadcrumbs 35a or 35b. The MFP 1 specifies a screen title for each level to be displayed in the breadcrumbs 35a or 35b based on these title IDs. The "screen type" is data indicating whether the screen is a menu screen or a wizard screen. The MFP 1 displays a screen title in the menu breadcrumbs 35a when "Menu" is recorded as the screen type for the hierarchical level corresponding to the screen title, and displays the screen title in the wizard breadcrumbs 35b when "Wizard" is recorded as the screen type for that level. The "setting value" is data indicating a user-inputted value for a wizard screen of the same level. The MFP 1 identifies the user-inputted value for each wizard screen based on this setting value and displays a setting value 35d expressing the identified value in the wizard breadcrumbs 35b.

FIGS. 5, 6, 8, and 9 are flowcharts illustrating steps in the setup screen display process. The CPU 11 of the MFP 1 periodically executes the setup screen display process when the MFP 1 is in the setup mode.

Figure 5:
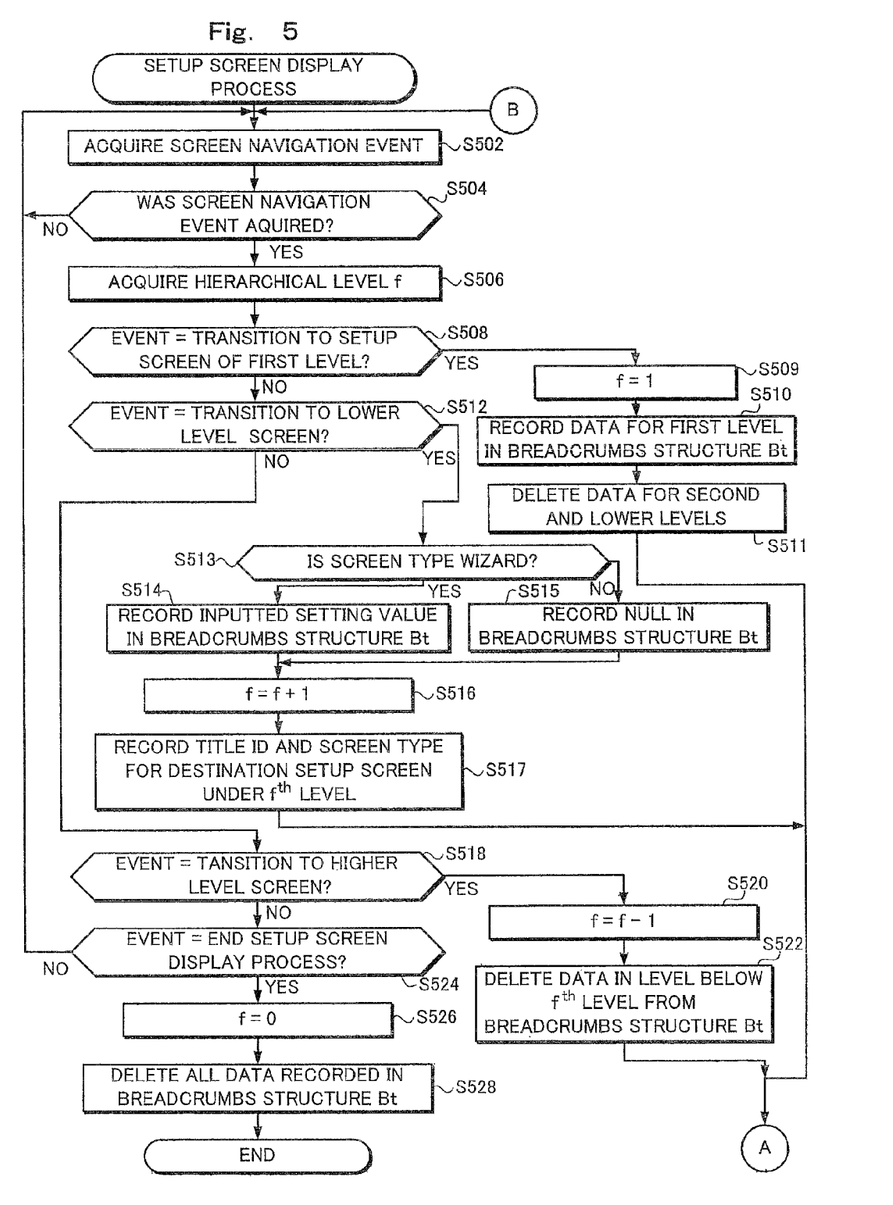
FIG. 5 is a flowchart illustrating steps in a setup screen display process.

In S502 at the beginning of the setup screen display process, the CPU 11 attempts to acquire a screen navigation event. Specifically, when the touch panel 28 detects an operation on the LCD panel of the LCD 27, such as when the user touches a selection 33 or the like, the CPU 11 acquires this detection data as a screen navigation event.

In S504 the CPU 11 determines whether a screen navigation event occurred. If not (S504: NO), then the CPU 11 repeats the process from S502.

However, if so (S504: YES), then in S506 the CPU 11 acquires a hierarchical level f for the currently displayed screen (i.e., set a hierarchical level f to a hierarchical level of the currently displayed screen.) In S508 the CPU 11 determines whether the screen navigation event acquired in S502 indicates a transition to the setup screen of the first level. If so (S508: YES), then in S509 the CPU 11 sets the hierarchical level f to "1", in S510 records the title ID for the first level and the screen type "Menu" in the breadcrumbs structure Bt, in S511 deletes data for the second and lower levels from the breadcrumbs structure Bt, and subsequently advances to S602 of FIG. 6.

However, if the CPU 11 determines that the screen navigation event does not indicate a transition to the first-level screen (S508: NO), then in S512 the CPU 11 determines whether the screen navigation event indicates a transition to a lower-level screen. A positive determination is made when, for example, the user presses a selection 33 displayed in the selection display area 32 (S512: YES), then in S513 the CPU 11 determines whether the screen type of the currently displayed setup screen is "Wizard." If not (S513: NO), then in S515 the CPU 11 records the value "null" as the setting value in the breadcrumbs structure Bt for the $f^{th}$ level. However, if so (S513: YES), then in S514 the CPU 11 records the value inputted by the user as the setting value for the $f^{th}$ level in the breadcrumbs structure Bt.

In S516 the CPU 11 increments the hierarchical level f by "1" and in S517 records the title ID and the screen type for $f^{th}$ level in the breadcrumbs structure Bt. Subsequently, the CPU 11 advances to S602 of FIG. 6.

On the other hand, if the CPU 11 determines in S512 that the event does not indicate a transition to a lower-level screen (S512: NO), then in S518 the CPU 11 determines whether the screen navigation event indicates a transition to a higher-level screen. A positive determination is made when, for example, the user operates the Cancel key (S518: YES). Then in S520 the CPU 11 decrements the hierarchical level f by "1" and in S522 deletes data in a level below the $f^{th}$ level from the breadcrumbs structure Bt. Subsequently, the CPU 11 advances to S602 of FIG. 6.

However, if a negative determination is made in S518 (S518: NO), then in S524 the CPU 11 determines whether the screen navigation event indicates an instruction to end the setup screen display process. For example, when the user inputs an instruction to switch from the setup mode to another mode (S524: YES), in S526 the CPU 11 resets the hierarchical level f to "0", in S528 deletes all data recorded in the breadcrumbs structure Bt, and subsequently ends the setup screen display process. However, if not (S524: NO), then the CPU 11 returns to S502 and repeats the above process.

Figure 6:
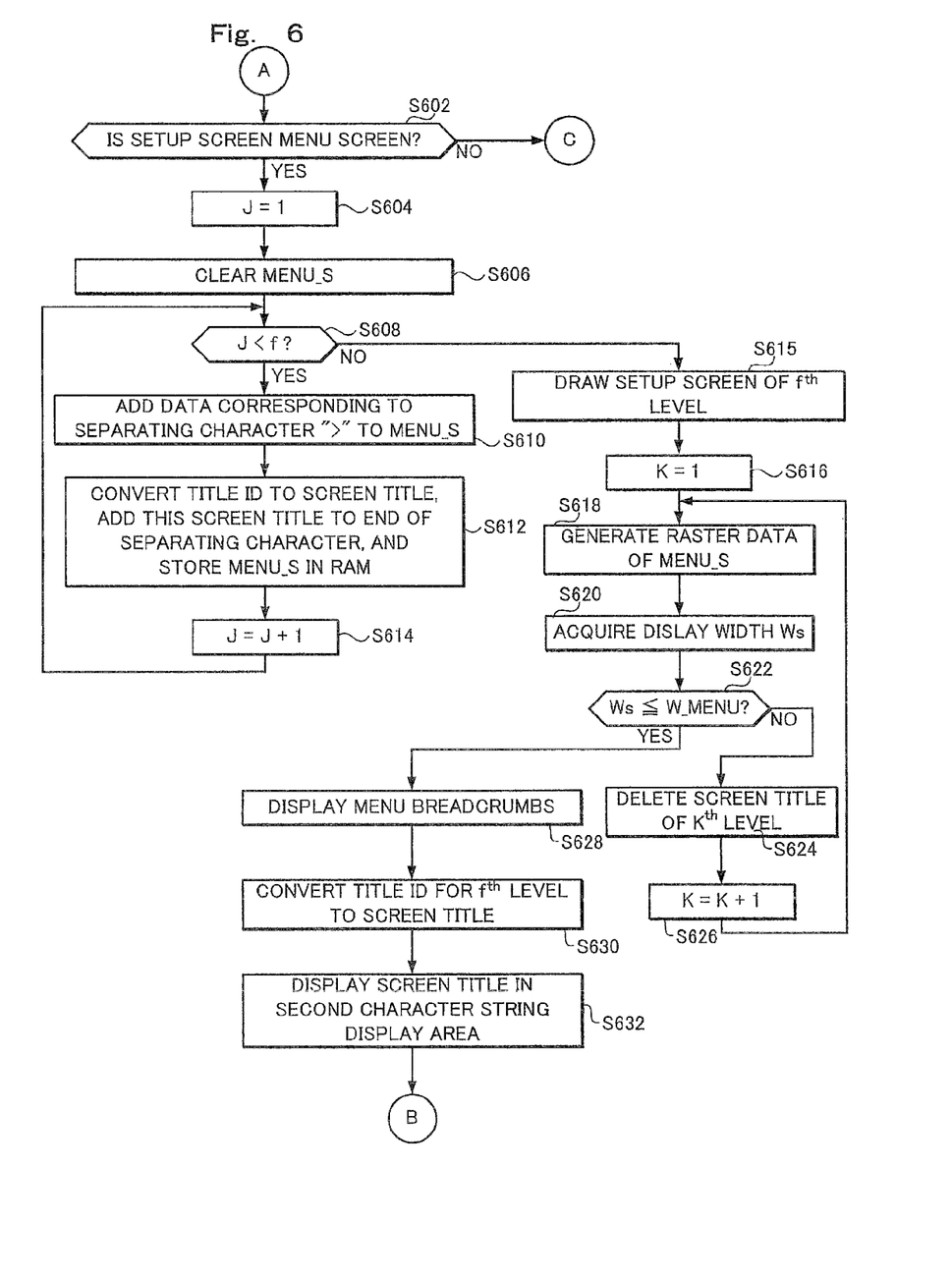
FIG. 6 is a flowchart illustrating steps in the setup screen display process following the flowchart of FIG. 5.

The continuation of the setup screen display process will be described with reference to FIG. 6. In S602 the CPU 11 determines whether the setup screen in the $f^{th}$ level is a menu screen. If not (S602: NO), then the CPU 11 advances to S802 of FIG. 8. However, if so (S602: YES), then in S604 the CPU 11 sets a variable J representing a level number to "1". In S606 the CPU 11 clears a menu breadcrumbs character string Menu_S. The menu breadcrumbs character string Menu_S is data representing the menu breadcrumbs 35a as character codes.

In S608 the CPU 11 determines whether the variable J is smaller than the hierarchical level 11f so (S608: YES), then in S610 the CPU 11 adds a character code corresponding to the separating character 35c ">" to the menu breadcrumbs character string Menu_S. In S612 the CPU 11 converts the title ID for the $J^{th}$ level recorded in the breadcrumbs structure Bt to a screen title with reference to the screen management table 12b, adds this screen title to the end of the character code in the menu breadcrumbs character string Menu_S corresponding to the separating character 35c that was added in S610, and stores the menu breadcrumbs character string Menu_S in the RAM 14. In S614 the CPU 11 increments the variable J by "1" and returns to S608.

The CPU 11 creates the menu breadcrumbs character string Menu_S by repeatedly performing the above process. If a negative determination is made in S608 (S608: NO), then in S615 the CPU 11 draws the setup screen of the $f^{th}$ level. For example, when the user performs an operation to select a setup screen positioned one level lower than the current menu screen by pressing one of the selections 33 in the menu screen (i.e., S512: YES), the MFP 1 draws on the LCD 27 the lower-level setup screen selected by the user. When necessary, the CPU 11 also draws the sidebar area 38 in S615.

In S616 the CPU 11 sets a variable K to "1". In S618 the CPU 11 rasterizes the menu breadcrumbs character string Menu_S to generate raster data R. In S620 the CPU 11 calculates a display width Ws corresponding to the length of the raster data R. Since the menu breadcrumbs character string Menu_S is rasterized before being displayed as menu breadcrumbs 35a in a subsequent process, the CPU 11 can acquire the length of the menu breadcrumbs 35a (i.e., the horizontal dimension of the character array) based on how the menu breadcrumbs 35a will actually be displayed in the first character string display area 34a by finding the length (display width Ws) of the rasterized breadcrumbs.

Figure 7:
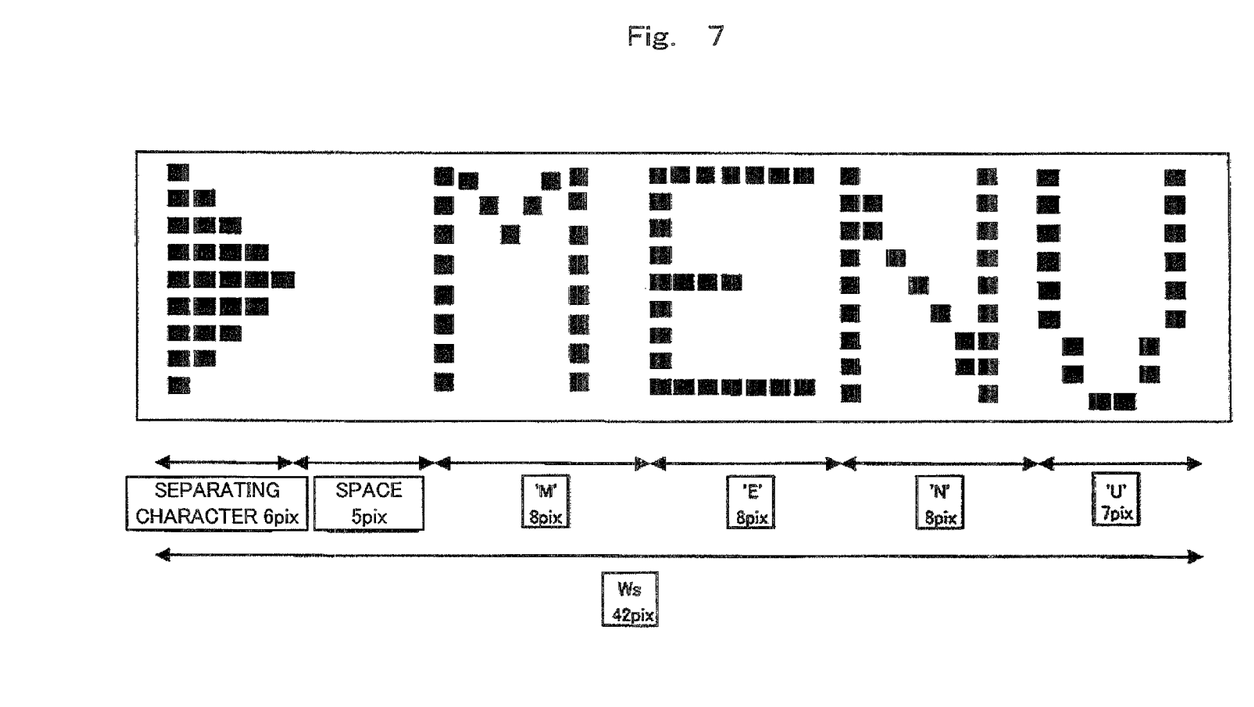
FIG. 7 is an enlarged view of a rasterized breadcrumbs.

FIG. 7 is an enlarged view of a breadcrumbs character string S that has been rasterized (raster data R). By rasterizing the menu breadcrumbs character string Menu_S, the CPU 11 acquires bitmap data representing the menu breadcrumbs 35b in an array of points (pixels). In the embodiment, the CPU 11 totals the number of pixels in the width direction required to display each character and space in order to calculate the display width Ws corresponding to the longitudinal length of the raster data R.

The MFP 1 may also allow the user to set a desired size or font for the text to be displayed on the LCD 27. In this case, in S618 the CPU 11 reads values for the text size and font set by the user and develops the menu breadcrumbs character string Menu_S into bitmap data based on these values. For some fonts, the width of each character may differ. With a proportional font, for example, the letter "U" shown in FIG. 7 has a width of seven pixels, while the letters "M", "E", and "N" have respective widths of eight pixels. Further, in many cases the width of roman characters differs from the width of Chinese characters (kanji). Hence, the CPU 11 can acquire a more accurate display width Ws through a calculation based on the rasterized bitmap data than through a calculation simply based on the number of characters.

Returning to FIG. 6, in S622 the CPU 11 determines whether the menu breadcrumbs 35a will fit within the first character string display area 34a when the menu breadcrumbs 35a are displayed in the first character string display area 34a based on the menu breadcrumbs character string Menu_S created above. Specifically, the CPU 11 determines whether the display width Ws indicating the length of the menu breadcrumbs 35a is less than or equal to a predetermined width W_Menu. The CPU 11 can accurately determine whether the menu breadcrumbs 35a will fit within the first character string display area 34a based on the display width Ws, since the display width Ws corresponds to the rasterized breadcrumbs. Here, the predetermined width W_Menu is a value equivalent to the number of pixels that can be displayed horizontally (longitudinal direction) in the first character string display area 34a.

If the CPU 11 determines that the display width Ws is greater than the predetermined width W_Menu (S622: NO), then in S624 the CPU 11 deletes the screen title of the $K^{th}$ level from the menu breadcrumbs character string Menu_S, in S626 increments the variable K by "1", and returns to S618. However, when the CPU 11 determines in S622 that the display width Ws is less than or equal to the predetermined width W_Menu (S622: YES), then in S628 the CPU 11 displays the menu breadcrumbs 35a corresponding to the menu breadcrumbs character string Menu_S in the first character string display area 34a. In S630 the CPU 11 converts the title ID recorded in the breadcrumbs structure Bt for the $f^{th}$ level to a screen title and in S632 displays this screen title in the second character string display area 34b. Subsequently, the CPU 11 returns to S502 of FIG. 5. Thus, when it is not necessary to display wizard breadcrumbs 35b in the second character string display area 34b because a wizard screen is not being displayed, the CPU 11 can display the screen title of the current menu screen (i.e., the setup screen of the $f^{th}$ level) in the second character string display area 34b. Accordingly, the CPU 11 maximizes the amount of information provided to the user by effectively utilizing the limited display area of the LCD 27.

Figure 8:
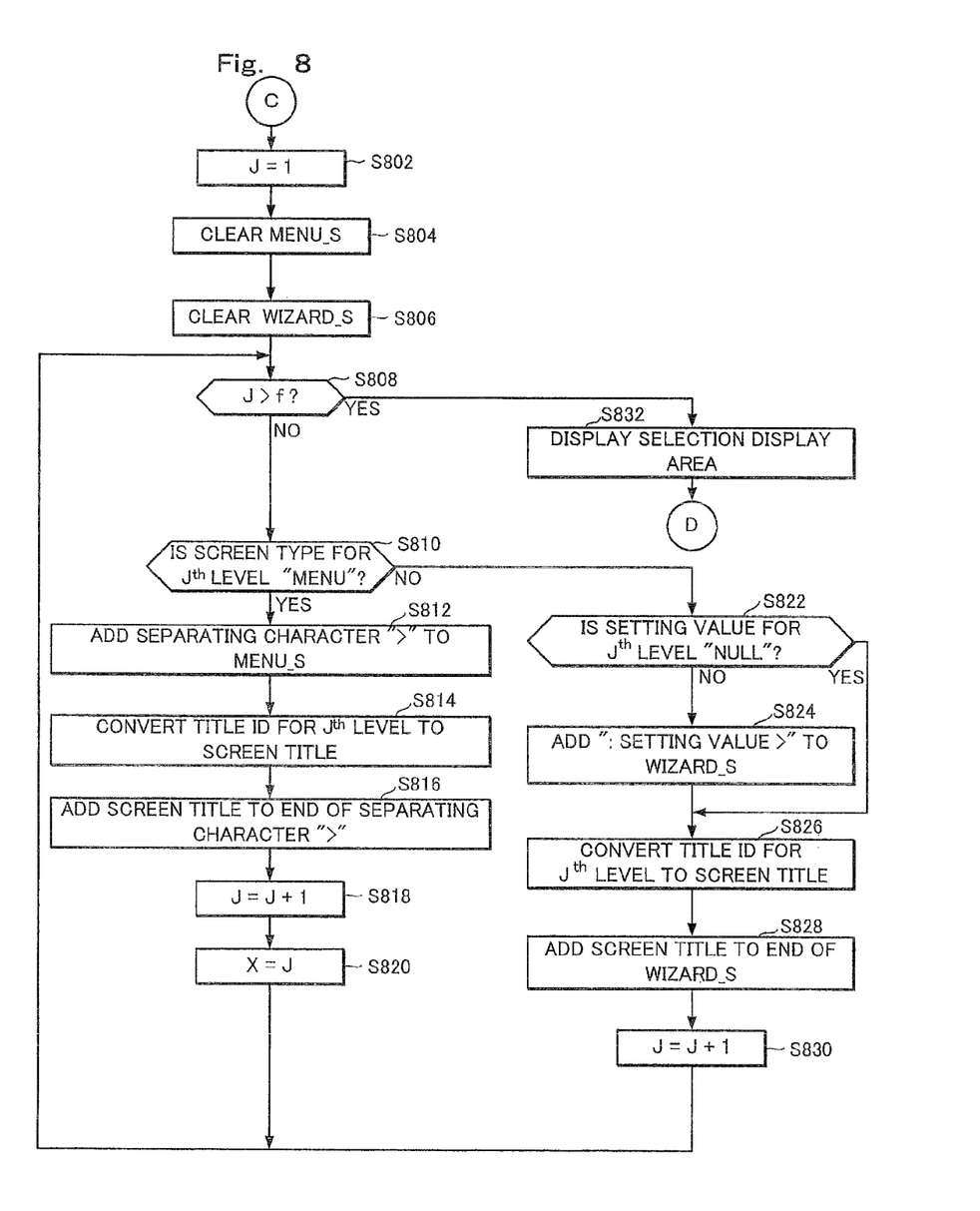
FIG. 8 is a flowchart illustrating steps in the setup screen display process following the flowchart of FIG. 6.

The continuation of the setup screen display process will be described with reference to FIG. 8. In S802 of FIG. 8 the CPU 11 sets the variable J representing a number level to "1". In S804 the CPU 11 clears the menu breadcrumbs character string Menu_S, and in S806 clears a wizard breadcrumbs character string Wizard_S. The wizard breadcrumbs character string Wizard_S is data representing the wizard breadcrumbs 35b as character codes.

In S808 the CPU 11 determines whether the variable J is larger than the hierarchical level f. Since the variable J is initially smaller than the hierarchical level f (S808: NO), then in S810 the CPU 11 determines whether the screen type stored in the breadcrumbs structure Bt for the $J^{th}$ level is "Menu."

If so (S810: YES), then in S812 the CPU 11 adds the character code corresponding to the separating character 35c to the menu breadcrumbs character string Menu_S. In S814 the CPU 11 converts the title ID stored in the breadcrumbs structure Bt for the $J^{th}$ level to a screen title with reference to the screen management table 12b. In S816 the CPU 11 adds this screen title to the end of the character code corresponding to the separating character 35c that was added to the menu breadcrumbs character string Menu_S in S812. In S818 the CPU 11 increments the variable J by "1", in S820 sets a variable X to the value of the variable J, and subsequently returns to S808.

When the CPU 11 determines in S810 after repeating the above process that the screen type for the $J^{th}$ level is "Wizard" rather than "Menu" (S810: NO), then in S822 the CPU 11 determines whether the setting value stored in the breadcrumbs structure Bt for the $J^{th}$ level is "null." If not (S822: NO), then in S824 the CPU 11 identifies the setting value for the $J^{th}$ level based on the breadcrumbs structure Bt (i.e., a value inputted by the user in the wizard screen of the $J^{th}$ level) and adds character codes corresponding to the separating character 35f ":", the setting value for the $J^{th}$ level, and the separating character 35c ">" to the wizard breadcrumbs character string Wizard_S. Thus, in a subsequent process the CPU 11 can display wizard breadcrumbs 35b based on the wizard breadcrumbs character string Wizard_S according to a format in which a setting value 35d is added to each screen title. The CPU 11 can also insert a separating character 35c between neighboring level data 35e and insert a separating character 35f between the screen title and setting value 35d in each level data 35e. However, if a positive determination is made in S822 (S822: YES), then the CPU 11 skips S824 and advances directly to S826.

In S826 the CPU 11 converts the title ID stored in the breadcrumbs structure Bt for the $J^{th}$ level to a screen title with reference to the screen management table 12b. In S828 the CPU 11 adds this screen title to the end of the wizard breadcrumbs character string Wizard_S in S824. In S830 the CPU 11 increments the variable J by "1" and returns to S808.

When the CPU 11 determines in S808 that J>f while repeating the above process (S808: YES), then in S832 the CPU 11 draws the wizard screen of the $f^{th}$ level in the selection display area, and subsequently advances to S902 of FIG. 9. Through the process shown in FIG. 8, the CPU 11 can create the menu breadcrumbs character string Menu_S and the wizard breadcrumbs character string Wizard_S based on the breadcrumbs structure Bt. When necessary, the CPU 11 also draws the sidebar area 38 in S832.

Figure 9:
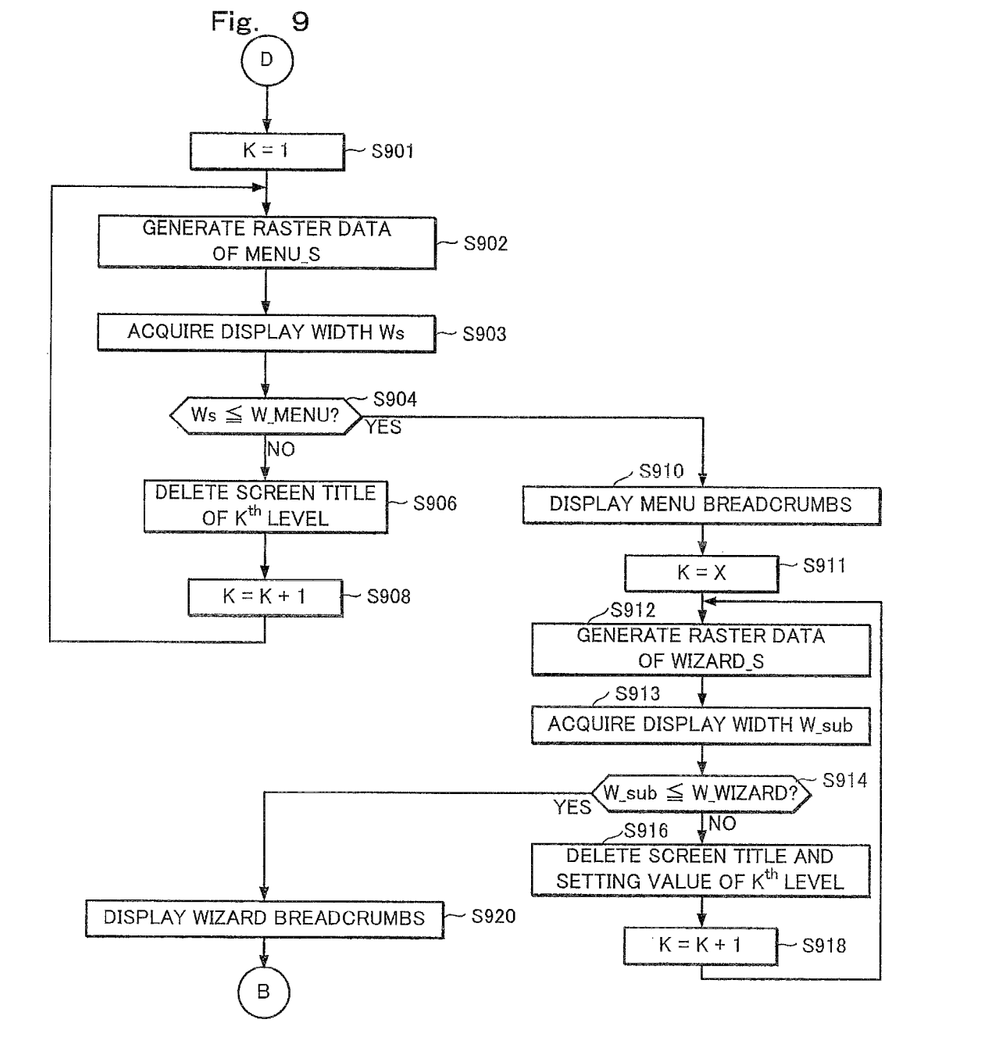
FIG. 9 is a flowchart illustrating steps in the setup screen display process following the flowchart of FIG. 8.

The continuation of the setup screen display process will be described with reference to FIG. 9. The process performed from S901 to S910 is very similar to the process in S616 through S628 described above with reference to FIG. 6 and will therefore be given only a brief description here. In S901 the CPU 11 sets the variable K to "1", in S902 generates raster data R by rasterizing the menu breadcrumbs character string Menu_S, and in S903 calculates a display width Ws corresponding to the length of the raster data R in the longitudinal direction. In S904 the CPU 11 determines whether the display width Ws is less than or equal to the predetermined width W_Menu. If not (S904: NO), then in S906 the CPU 11 deletes the screen title of the $K^{th}$ level from the menu breadcrumbs character string Menu_S, and then in S908 increments the variable K by "1", and returns to S902. However, if so (S904: YES), then in S910 the CPU 11 displays the menu breadcrumbs 35a corresponding to the menu breadcrumbs character string Menu_S in the first character string display area 34a.

In S911 the CPU 11 sets the variable K to the value of the variable X. In S912 the CPU 11 generates raster data R by rasterizing the wizard breadcrumbs character string Wizard_S. In S913 the CPU 11 calculates a display width W_sub corresponding to the length of the raster data R in the longitudinal direction. In S914 the CPU 11 determines whether the display width W_sub is less than or equal to a predetermined width W_Wizard, where the predetermined width W_Wizard is equivalent to the number of pixels that can be displayed across the second character string display area 34b in the horizontal direction. If not (S914: NO), then in S916 the CPU 11 deletes the screen title and setting value for the $K^{th}$ level from the wizard breadcrumbs character string Wizard_S, and then in S918 increments the variable K by "1", and returns to S912. However, if so (S914: YES), then in S920 the CPU 11 displays the wizard breadcrumbs 35b corresponding to the wizard breadcrumbs character string Wizard_S in the second character string display area 34b.

The MFP 1 according to the embodiment displays wizard breadcrumbs 35b that include the screen title for each wizard screen displayed up to and including the current wizard screen, and a setting value 35d inputted for each wizard screen. The setting value 35d is added to the right of the screen title for the corresponding wizard screen. Accordingly, the MFP 1 can clearly present setting values to the user that were inputted for each wizard screen leading up to the currently displayed wizard screen.

While the invention has been described in detail with reference to specific embodiment thereof, it would be apparent to those skilled in the art that many modifications and variations may be made therein without departing from the spirit of the invention, the scope of which is defined by the attached claims.

For example, while the breadcrumbs 35a and 35b are each displayed in a single line in the preferred embodiment described above, each of the breadcrumbs 35a and 35b may be displayed in multiple lines with line breaks therebetween. In this case, the predetermined width compared with the display width Ws or W_sub would be a value found by multiplying the horizontal width of the character string display area 34a or 34b by the number of lines available for displaying the breadcrumbs.

In the embodiment described above, the MFP 1 determines whether the breadcrumbs 35a or 35b fits within the respective character string display area 34a or 34b based on the display width Ws or W_sub expressing the horizontal dimension of the breadcrumbs 35a or 35b. However, the MFP 1 may be configured to determine whether the breadcrumbs 35a or 35b fits within the respective character string display area 34a or 34b based on the number of characters constituting the breadcrumbs 35a or 35b.

In the embodiment described above, a separating character 35f having a different format from the separating character 35c is interposed between the screen title and the setting value 35d in each level data 35e. However, the same separating character used as the separating character 35c (the ">" symbol in the preferred embodiment) may also be interposed between the screen title and the setting value 35d in each level data 35e. For example, when the screen title is "SSID," the setting value 35d is "abc," and the separating character 35c is ">", the level data 35e will be displayed as "SSID>:abc." Thus, the user can identify the points at which each screen title is separated from its corresponding setting value 35d based on the ":" symbol used as the separating character 35f. Accordingly, both the separating characters 35c and 35f may be provided in this format.

In the embodiment described above, the setting value data is added to all corresponding character strings in the navigation string for the wizard screens. However, the setting value data may be added only to a corresponding character string in the navigation string that is associated with display data for which a setting value was inputted.

Further, a "character" in the scope of the specification is not limited to a character directly related to language, such as characters in an alphabet, but may also be numbers, symbols, or other characters.

What is claimed is:

1. A display device comprising:
 a display unit that includes a first region and a second region, the display unit displaying, in the first region, one of a plurality of screen images managed hierarchically, the plurality of screen images including a first screen image and a second screen image;
 a storing unit configured to store a plurality of character strings corresponding to the plurality of screen images;
 a navigation string generating unit including:
  a specifying unit configured to specify a setting value selected for at least the second screen image that was navigated through to arrive at the first screen image currently displayed in the first region; and a generating unit configured to generate a navigation string comprising at least the character string corresponding to the second screen image and a setting data representing the setting value corresponding to the second screen image;

a display control unit configured to control the display unit to display the navigation string in the second region;

a first transition unit configured to change the first screen image displayed in the first region to a third screen image of a lower hierarchical level than the first screen image when a user selects the third screen image belonging to a first group; and a second transition unit configured to control the display unit to sequentially display, in the first region, a plurality of screen images belonging to a second group in order of hierarchical level by a wizard format for guiding the user in selecting setting values according to a fixed procedure, wherein the navigation string includes:

a first navigation string including at least one of the character strings corresponding to a screen image belonging to the first group;

a second navigation string including at least one of the character strings corresponding to the second screen image belonging to the second group and the setting data before guiding the user in the selecting setting value; and a third navigation string including another at least one of character strings corresponding to one of the plurality of screen images belonging to the second group and the setting data, the one screen image obtained after guiding the user in selecting setting values, wherein the display control unit controls the display unit such that the first navigation string is displayed in a first line and the second navigation string and the third navigation string are displayed in a second line different from the first line.

2. The display device according to claim 1, wherein the second navigation string includes level data including at least one of the character strings and the setting data concatenated in a longitudinal direction of the at least one of the character strings, and the display control unit controls the display unit to display the second navigation string in the longitudinal direction.

3. The display device according to claim 2, wherein the display control unit controls the display unit to display the setting data in a form different from a form of the character string.

4. The display device according to claim 3, wherein the navigation string generating unit further includes a first arranging unit that interposes a first separating character between adjacent sets of the level data.

5. The display device according to claim 4, wherein the navigation string generating unit further includes a second arranging unit that interposes a second separating character different from the first separating character between the character string in the level data and the setting data included in the level data.

6. The display device according to claim 1, wherein the storing unit stores the plurality of the character strings corresponding to the screen images such that:

either at least one of the character strings corresponding to additional screen images belonging to the first group or at least one of the character strings corresponding to the plurality of the screen images belonging to the second group is stored in lower hierarchical level than the character strings corresponding to the third screen image belonging to the first group; and at least one of the character strings corresponding to the plurality of the screen images belonging to the second group is stored in lower hierarchical level than the character strings corresponding to the plurality of screen images belonging to the second group.

7. The display device according to claim 1, wherein the display control unit controls the display unit to display the first navigation string in the second line if the navigation string includes only the first navigation string.

8. A method for displaying a navigation string together with one of a plurality of screen images managed hierarchically, the plurality of screen images including a first screen image and a second screen image, the method comprising:

specifying a setting value selected for at least the second screen image that was navigated through to arrive at the first screen image currently displayed a the first region of a display device;

generating the navigation string comprising at least character strings corresponding to the second screen image and a setting data representing the setting value corresponding to the second screen image;

displaying the navigation string in a second region of the display device;

changing the first screen image displayed in the first region to a third screen image of a lower hierarchical level than the first screen image when a user selects the third screen image belonging to a first group; and displaying sequentially, in the first region, a plurality of screen images belonging to a second group in order of hierarchical level by a wizard format for guiding the user in selecting setting values according to a fixed procedure, wherein the navigation string includes at least one of:

a first navigation string only including at least one of the character strings corresponding to a screen image belonging to the first group;

a second navigation string only including at least one of the character strings corresponding to the second screen image belonging to the second group and the setting data before guiding the user in selecting setting values; and a third navigation string including another at least one of character strings corresponding to one of the plurality of screen images belonging to the second group and the setting data, the one screen image obtained after guiding the user in selecting setting values wherein the display control unit controls the display unit such that the first navigation string is displayed in a first line and the second navigation string and the third navigation string are displayed in a second line different from the first line.

9. The method according to claim 8, wherein the character strings corresponding to plurality of screen images are stored such that:

either at least one of the character stings corresponding to additional screen images belonging to the first group or at least one of the character strings corresponding to the plurality of the screen images belonging to the second group is stored in lower hierarchical level than the character strings corresponding to a third screen image belonging to the first group; and at least one of the character strings corresponding to the plurality of the screen images belonging to the second group is stored in lower hierarchical level than the character strings corresponding to the plurality of screen images belonging to the second group.

10. The method according to claim 8,
wherein the first navigation string is displayed in the second line if the navigation string includes only the first navigation string.

\* \* \* \* \*